United States Patent [19]

Kolodesh et al.

[11] Patent Number: 4,511,318
[45] Date of Patent: Apr. 16, 1985

[54] DOUGH ROLLING APPARATUS FOR LAMINATED COOKIES

[75] Inventors: Michael S. Kolodesh; Edward L. Peters; Raymond J. Madgett, all of Cincinnati, Ohio

[73] Assignee: The Procter & Gamble Company, Cincinnati, Ohio

[21] Appl. No.: 579,837

[22] Filed: Feb. 21, 1984

Related U.S. Application Data

[63] Continuation-in-part of Ser. No. 475,772, Mar. 16, 1983, abandoned.

[51] Int. Cl.³ .................. B29D 7/10; A21C 3/04; A21C 7/01; A21C 7/04
[52] U.S. Cl. ................. 425/133.1; 99/450.7; 99/485; 156/243; 156/244.12; 156/244.18; 425/297; 425/308; 425/332; 426/94; 426/297; 426/502; 426/512
[58] Field of Search ............ 425/130, 133.1, 296, 425/297, 308, 332; 426/94, 297, 502, 512; 99/450.7, 485; 156/244.11, 244.12, 243, 244.18

[56] References Cited

U.S. PATENT DOCUMENTS

| | | | |
|---|---|---|---|
| 776,731 | 12/1904 | Dietz | 425/332 |
| 786,042 | 3/1905 | Loncaric | 425/332 |
| 802,061 | 10/1905 | Thomas | 425/332 |
| 978,440 | 12/1910 | Eggenhofer | 425/332 |
| 1,236,505 | 8/1917 | Van Houten | 425/332 |
| 1,948,870 | 2/1934 | Pointon et al. | 425/332 |
| 1,970,336 | 8/1934 | Pointon et al. | 425/332 |
| 2,073,647 | 10/1981 | Cummins | 118/100 |
| 3,225,714 | 12/1965 | Gaskell | 425/454 |
| 3,572,259 | 3/1971 | Hayashi | 426/94 |
| 4,155,691 | 5/1979 | Ridgeway et al. | 425/140 |

FOREIGN PATENT DOCUMENTS

| | | | |
|---|---|---|---|
| 937735 | 8/1948 | France | 425/332 |
| 947648 | 7/1949 | France | 425/332 |
| 506364 | 1/1976 | U.S.S.R. | 425/332 |

Primary Examiner—Willard E. Hoag
Attorney, Agent, or Firm—John J. Ryberg; E. Kelly Linman; John V. Gorman

[57] ABSTRACT

An apparatus for making a generally spherical laminate dough preform that has a first inner dough substantially uniformly encapsulated by one or more outer doughs. If the preform contains morsels such as flavored chips, the appparatus will distribute and optimize the visibility of the morsels in the final baked product.

10 Claims, 12 Drawing Figures

DOUGH ROLLING APPARATUS FOR LAMINATED COOKIES

CROSS-REFERENCE TO RELATED APPLICATION

This is a continuation-in-part of copending patent application Ser. No. 475,772, filed Mar. 16, 1983 abandoned.

TECHNICAL FIELD

The present invention relates to an apparatus that is used in making simulated drop cookies of superior quality and appearance. Specifically, by rolling a laminated dough preform comprised of at least two distinct types of dough prior to baking, the apparatus not only prevents the final cookie from having an undesirable thin and crisp edge, but also serves to encapsulate one of the dough types completely within the other. In addition, if the dough preform contains morsels such as flavored chips, the apparatus' rolling action smears the preform's outer layer thereby enhancing the visibility, appearance, and distribution of the chips in the finished cookie.

BACKGROUND OF THE INVENTION

Substantially homogeneous prior art drop cookies can be made by using a rotary molder. Typically, a rotary molder has a movable first belt or drum that contains cavities of the final cookie's desired shape. At one point in the motion of the first belt or drum, the cavities are filled with cookie dough of the desired formulation. Further travel of the belt or drum transfers the dough by preferential adherence to a second moving belt or band that is in contact with or in close proximity to the first belt or drum. Thereafter, the dough is conveyed through a continuous oven and baked.

In the manufacture of other prior art cookies, substantially homogeneous dough is deposited directly on the moving belt or band by extruding discrete deposits of the substantially homogeneous dough via extrusion dies of the desired shape. Still other prior art cookies comprised of substantially homogeneous dough are made by such processes as extrusion or by forming a sheet of dough from which the desired shapes are cut. It is also known in the art to make cookies by laminating already baked cookie portions with fillings, icings, marshmallow creme, and the like.

In the past, a wide variety of equipment has been utilized in practicing these manufacturing processes. For example, U.S. Pat. No. 1,948,870, issued Feb. 27, 1934, and U.S. Pat. No. 1,970,336, issued Aug. 14, 1934, both issued to Pointon and Harber and assigned to Baker Perkins Co., Inc., are directed to dough forming apparatus comprised of open top cups or rings that move in an orbital path to form a dough piece that is confined therein. A stated objective is to mold the dough pieces into a spherical shape by giving rows of molding cups or rings an orbital balling movement of variable amplitude about the axis of each cup. A support surface for the dough pieces is positioned opposite the molding rings and can be periodically advanced stepwise so that dough pieces rolled by one row of cups or rings are in position for treatment by the next row of cups or rings.

U.S. Pat. No. 3,225,714, issued Dec. 28, 1965 to Gaskell discloses improved molding rings and closed top cups for use in forming dough products. The cups appear to be intended for use on apparatus of the type generally disclosed in the Pointon et al. patents. The cups are provided with dough-working ribs that have a substantial axial directional component and provide undulations that are so shaped as to knead or work a dough piece as the cups are moved in a gyratory motion. According to Gaskell, the gyratory motion and the cup's internal taper urge the dough downwardly onto the conveyor so as to assure its effective molding adhesion thereto, while the ribs on the interior of the cup work over the external surface of the dough and create air spaces between the dough and the ribs. These air spaces help in reducing the tendency of the dough to stick to the mold. A multiple cup unit for carrying a plurality of detachable cups of various sizes is also described.

While it is clear from the foregoing references that various apparatus for rolling pieces of dough-like product are generally known in the art, it is significant that none of the foregoing references are directed to rolling a dough piece wherein the objective is to simulate drop cookies that are made by for example, a rotary molder. It is also significant that none of the foregoing references ae directed to laminated products comprised of at least two distinct types of dough, wherein the objective is to substantially and uniformly encapsulate an inner dough portion within a distinct outer dough portion. In addition, none of the foregoing references disclose rolling such a multi-dough structure that contains flavored chips or other morsels to thereby control the visibility, appearance, and distribution of the chips in the baked product.

European Patent Application No. 31,718, Hong and Brabbs, filed Dec. 23, 1980 and published July 8, 1981, which is hereby incorporated herein by reference, describes the manufacture of laminated cookies wherein different doughs are combined to produce a product whose long-term texture mimics that of freshly baked cookies. The cookies are made from laminated dough structures formed by a variety of methods. These methods include (1) encapsulating an inner dough within a distinct outer dough by hand crimping discs of outer dough around a ball of inner dough, (2) layering sheets of two or more alternating doughs that have been previously cut to the appropriate size, (3) alternately layering large sheets of two or more different doughs followed by cutting the resultant structure into pieces, (4) laminating one or more doughs onto the top of, or a portion of the top of, a distinct dough (5) embedding particles of one or more doughs into a distinct dough, (6) winding strands of one or more doughs onto the surface of a ball of a distinct dough, (7) laminating alternating sheets of two or more doughs, rolling, and slicing, or (8) using an encrusting machine, such as a Rheon ® Model 207 available from Rheon USA of Paramus, N.J., to simultaneously and concentrically co-extrude an inner dough and a distinct outer dough whereby the outer dough wraps around the inner dough.

It has been discovered that rolling the laminated dough structures formed by such laminating methods prior to baking substantially eliminates crisp edges and results in cookies of superior overall appearance and quality, particularly when the method used to form the dough preform does not form the laminated dough into a ball. Particularly noticeable improvements have been observed when the methods used to make the laminate dough preforms include, for example: co-extruding the doughs in a continuous form and thereafter cutting the co-extruded dough to yield rectangular segments or other shapes which are non-spherical or non-hemispherical in shape; a sheet/deposit/sheet/cut method wherein a multi-layer dough structure is cut from a laminated structure comprised of a first layer of dough upon which inner dough pieces are deposited and thereafter covered with a second sheet of the first or a third dough; and other equivalent processes that generate a laminate structure having a non-hemispherical or non-spherical shape.

It has been discovered that cookies of the Hong and Brabbs type made from processes generating non-spherical laminate dough pieces have different baking dynamics than cookies of the Hong and Brabbs type with spherical laminate dough pieces. In the case of Hong and Brabbs non-spherical laminate dough pieces, the resultant cookie typically has an undesirable thin, crisp, and dark outer edge. This undesirable edge is primarily due to the finite amount of perimeter space that is required to seal the outer dough around the inner dough. A lack of inner dough at the edges where the outer dough sheets meet and seal can also cause the baked cookie to have a thin, crisp, and dark edge. Likewise, a lack of inner dough in the corners of dough pieces of rectangular or other geometric shapes yields the same undesirable result. These thin, crisp edges contribute to product breakage and reduced consumer acceptance. At the same time, the use of some of the laminating processes described earlier herein can result in decreased visibility on the surface of the finished product of chips or morsels contained in the inner dough. This also contributes to reduced consumer acceptance.

Accordingly, an object of the present invention is to make a high quality, simulated drop cookie from a plurality of laminated doughs made by a sheet/deposit/sheet/cut method.

A further object of the present invention is to prevent the formation of an undesirable crisp, thin, and dark edge on a laminated cookie.

A further object of the present invention is to roll a laminated dough piece whereby the inner dough is substantially and uniformly encapsulated within a distinct outer dough.

A further object of the present invention is to control the degree of visibility and distribution of flavored chips or other morsels in a baked product.

These and other objects of the present invention will be evident from the following disclosure:

DISCLOSURE OF THE INVENTION

The present invention is used in a process for making an improved crumb-continuous cookie that is made from a plurality of cookie doughs, and thereby has distributed therein discrete regions of storage-stable crisp texture and discrete regions of storage-stable chewy texture. In a particularly preferred embodiment, the process comprises the steps of:

(a) forming a laminate cookie preform from various distinct doughs;

(b) rolling the preform to substantially encapsulate at least one of the doughs; and (c) baking the rolled preform.

The laminated cookie preforms are preferably rolled into a substantially spherical or substantially hemispherical shape to provide essentially uniform encapsulation of at least one inner dough within at least one distinct outer layer of dough. This uniform encapsulation significantly helps in preventing the formation of a thin, discolored, and easily broken crisp edge on the baked cookie. The rolling step also reduces the need for complex formulation changes to control dough spread for various oven types and baking conditions. The rolling step also controls the distribution and visibility of any flavored chips or other morsels.

Preferably, the laminate dough preforms are rolled by an orbiting cup device comprising:

(1) a platen having one or more rows of one or more closed-top cup or cavity units;

(2) a mechanical arm connected pivotally to the platen;

(3) a base support rotatably connected to the mechanical arm;

(4) means for moving the platen vertically and horizontally simultaneously; and (5) means for rotating the platen in a circular orbital motion while simultaneously moving horizontally parallel to a continuously moving conveyor belt supporting the laminate dough pieces.

The size of the closed-top cup or cavity unit relative to the dough piece is such that the cup's inner surface smears the dough's outer top surface, whereby the visibility or exposure of morsels such as flavored chips, nuts, and the like is significantly enhanced. Each dough piece is rolled by a single cup or cavity unit. Preferably, a plurality of dough pieces are simultaneously rolled by a platen that has a corresponding plurality of closed-top cups or cavity units. This type of platen provides correct alignment and spread of the pieces on the continuously moving conveyor belt, thereby preventing the individual dough pieces from coming into contact with each other while being baked.

BRIEF DESCRIPTION OF THE DRAWINGS

While the specification concludes with claims particularly pointing out and distinctly claiming the subject matter that is regarded as forming the present invention, it is believed that the invention will be better understood from the following description accompanied by the following drawings in which:

Like reference numbers in the several figures indicate the like items or components.

DESCRIPTION OF THE PREFERRED EMBODIMENTS

Figure 1:
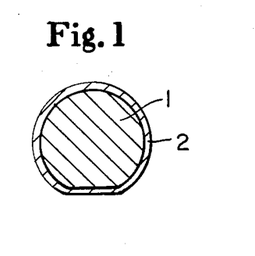
FIG. 1 is a cross-sectional elevation of a co-extruded, substantially spherical laminate dough piece for a cookie of the Hong and Brabbs type.
Figure 2:
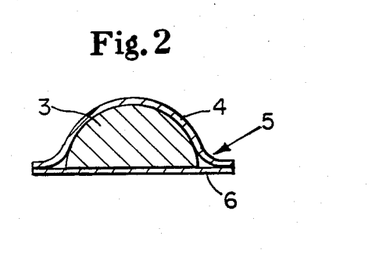
FIG. 2 is a cross-sectional elevation of a laminate dough piece made by the sheet/deposit/sheet/cut process for a cookie of the Hong and Brabbs type.

The initial shape of dough preforms for laminated cookies of the Hong and Brabbs type depend on the method of formation. Examples of distinct shapes are shown in FIGS. 1 and 2. FIG. 1 is a cross-section of a co-extruded laminate dough preform that is essentially spherical in form and resembles a dough piece made by a rotary molder. As shown in FIG. 1, inner dough 1 is uniformly encapsulated within a distinct layer of outer dough 2. FIG. 2 is a cross-section of a dough preform made by the sheet/deposit/sheet/cut process. Inner dough or filling 3 is not uniformly encapsulated by outer doughs 4 and 6. The preform is not spherical, but instead has an overlapping of the bottom and top dough sheets, 4 and 6, around the perimeter. This overlapping area 5 forms a seal that encloses inner dough deposit 3.

The distinct shape of a dough preform results in different flow dynamics during baking. When the substantially spherical dough piece of FIG. 1 is baked, it spreads via a "roll" type flow, i.e., dough near the diameter of the sphere rolls downward onto the baking surface. This "roll" type flow is denoted by the arrows in FIG. 1A. When the dough piece of FIG. 2 is baked it spreads via a "slide" type flow, i.e., the weight of the center deposit exerts a downward force that pushes the perimeter seal of bottom and top doughs outward. This "slide" type flow is denoted by the arrows in FIG. 2A. Thus, the difference in baking dynamics of the two shapes results in a baked product having a distinctly shaped cross-section, as seen in a comparison of FIGS. 1B and 2B.

Figure 1A:
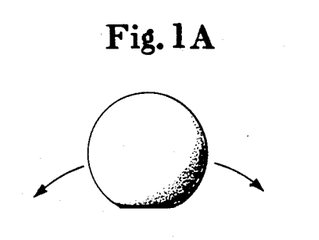
FIG. 1A is a side elevation view of a co-extruded substantially spherical laminate dough piece for a cookie of the Hong and Brabbs type.
Figure 1B:
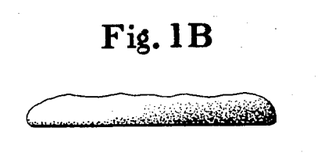
FIG. 1B is a side elevation view of a baked laminated cookie of the co-extruded dough piece of FIG. 1A.

FIG. 1B is a cross-section of a baked laminated cookie of the substantially spherical, co-extruded dough piece of FIG. 1A. The cookie's rolled outer edges result from the "roll" type flow of the dough during baking. FIG. 2B is a cross-section of a baked laminated cookie of the dough piece of FIG. 2A made by the sheet/deposit/sheet/cut process. The thin, crisp edge, denoted as 7, can occur at the cookie perimeter which corresponds to the overlapping seal area 5 of outer doughs 4 and 6, as shown in FIG. 2. The thin edge is often darker in color than the remainder of the cookie and is usually easily broken.

Figure 2A:
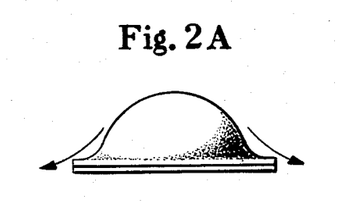
FIG. 2A is a side elevation view of a laminate dough piece made by the sheet/deposit/sheet/cut process for a cookie of the Hong and Brabbs type.
Figure 2B:
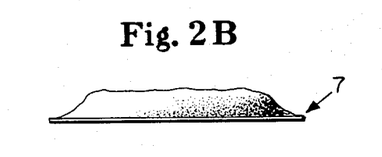
FIG. 2B is a side elevation view of a baked laminated cookie of the dough piece made by the sheet/deposit/sheet/cut process of FIG. 2A.

The present invention is used in a process for preparing baked cookies of the preferred type illustrated in FIG. 1B from a dough preform with the shape shown in FIG. 2A and from dough preforms having shapes that are not initially rounded, hemispherical, or spherical.

Forming a Cookie Preform

The first step of a preferred process to which the present invention has applicability is forming a cookie preform from multiple doughs. Laminated dough structures, denoted herein as cookie preforms, can be made form a variety of techniques within the skill of those in the food production art. Of particular interest herein are those processes that generate a dough structure that is not rounded, hemispherical, or spherical in shape but instead has edges, corners, and the like. Examples of two such processes of forming such a cookie preform will hereinafter be described. One is a sheet/deposit/sheet/cut process and the other a co-extrusion process.

A. Sheet/Deposit/Sheet/Cut Process

Forming a sheet of a first cookie dough by appropriate means is required. Sugar, flour, water, and shortening, when combined in almost any reasonable proportions, will produce a dough that can be baked into a cookie. In general, any cookie formulation that produces an organoleptically acceptable cookie can be used in practicing this invention. Those skilled in the art are familiar with formula variations for controlling the rheology of the dough to render it suitable for specific manufacturing techniques, e.g. sheeting, rotary molding, extrusion, and other commercial treatments. The formulations employed in the present invention may also be optimized to provide a dough rheology consistent with minimizing the formation of a thin, crisp edge in the baked product.

The dough can be rolled by hand with a conventional rolling pin. Alternatively, a dough mass can be passed through a plurality of smooth parallel sheeting rolls to provide a smooth, coherent, workable dough sheet. As the dough sheet passes off the last roll in the series, the dough is removed by a doctor blade angularly disposed with respect to the surface of the last sheeting roll. Doctoring angles formed between the blade and the roll of up to about 180° (the maximum theoretical value) are preferably used. Two roll mills, three roll mills, four roll mills, etc. can be used. When multiple roll milling is used, the speed of successive rolls, as measured in the direction of dough travel, is preferably increased with the faster roll revolving at least 1% to 2%, preferably at least 3%, faster than the slowest roll. This ensures that the dough sheet will conveniently be fed to the faster moving roll. Roll gap can be adjusted to provide a sheet of the desired thickness. As the sheet is doctored from the final roll in the series, it is preferably transferred directly to a continuous band or belt for further processing.

Next, a second cookie dough or filling is deposited on the sheet of first cookie dough. This is conveniently accomplished by using a standard rotary molder. Dough deposits in the rotary molder's cavities adhere to the tangentially moving belt at the point of contact with the rotary molder and are transferred to the continuously moving sheet of first dough.

Alternatively, deposits of second cookie dough or filling can be placed on the sheet of first dough by extruding the second dough either continuously or in discrete segments under pressure through one or more extrusion dies or tubes positioned over the sheet of first dough. In yet another embodiment, the second dough can be formed into individual pieces that are directly placed at predetermined locations on the sheet of first dough.

It is preferable in the practice of the present invention to have individual discrete deposits of second dough that are substantially hemispherical or substantially spherical in shape. The substantially hemispherical or substantially spherical shape of the second dough pieces facilitates the later steps of the process in providing a preferred dough shape around which the sheets of first and third dough can be formed during the rolling step.

Next, a sheet of third cookie dough is formed and placed on top of the second cookie dough deposits. The dough can be extruded under pressure through a wide extrusion die or passed through a plurality of smooth parallel sheeting rolls, as in the first step of the process.

The layered doughs are then cut into discrete cookie preforms. Preferably, this is accomplished by a mechanism that cuts through the layered doughs in the area where only the first and third doughs are present, i.e. around the individual pieces of second dough. Tamping the top dough sheet with a roller prior to cutting aids in molding it around the second dough deposits. A continuous cutting mechanism that moves synchronously with the dough sheets on the moving belt or band is particularly useful in generating the desired cookie preforms. Precise cutting of the composite dough pieces is not essential for good final cookie appearance because the preforms are ultimately reshaped in the practice of the present invention during the rolling step. Preferably, the cutting mechanism cuts through the doughs without damaging the conveyor belt or band and simultaneously crimps the edges of the upper and lower doughs to seal the deposited intermediate dough. The preforms can be cut into any desired shape, such as circular, square, rectangular, etc. When multiple preforms are concurrently cut, the deposits of intermediate dough are so positioned that the preferred shape is a hexagon that does not generate waste dough intermediate adjacent cookie preforms.

In another embodiment of a process for making a preform, the cutting occurs prior to layering, or assembling of the doughs. In this process, the first and third doughs are sheeted and cut into the desired shapes. Next, the second dough deposit is inserted between the first and third doughs. In yet another embodiment, the cutting occurs during dough layering. In this process, the first dough is cut after the second dough is deposited thereon, followed by layering a sheet or individual precut pieces of the third dough on top. Alternatively, the first dough is cut prior to depositing the second dough thereon, followed by layering a sheet or individual precut pieces of the third dough on top. If the third dough is in sheet form, a second cutting would be required.

B. Co-extrusion Process

An alternative process for forming a multiple-dough cookie preform is co-extrusion. In such a process, two or more distinct doughs are continuously extruded from separate hoppers as concentric cylinders whereby the cylindrical solid core of inner dough is surrounded by one or more layers of cylindrical rings of distinct outer dough. The continuous cylinder is then cut perpendicular to the direction of extrusion to form individual dough preforms.

Any suitable extrusion equipment can be employed. Typically, the extruder comprises two or more hoppers having feed rolls that channel the dough through a number of tubes called die cups or through extrusion nozzles that have orifices of any desired shape. Dough is fed to the hoppers either manually or mechanically with a pump or other suitable means. As an alternative to multiple distinct hoppers, separator plates can be inserted into a single large hopper. Feeding the dough at a steady rate is important to assure constant extrusion. Usually two or more feed rolls are used and the separation between the rolls is preferably adjustable. Action of the feed rolls can be continuous or intermittent. Roll speed should be such that the dough is not overheated by excess friction. Preferably, the speed of one feed roll corresponds to the speed of the other feed rolls.

The dough exits from the hopper in a continuous concentric cylinder through an extrusion nozzle that has an orifice of any desired size and shape and is deposited onto a conveyor belt. The continuous cylinder is then cut into individual dough preforms in a direction substantially perpendicular to its direction of travel. Preferably the dough is cut such that the outer dough layer is smeared across the inner dough that would otherwise be exposed, thereby encapsulating or substantially enrobing the inner dough piece within a layer of outer dough. When sufficient cutting pressure is used to achieve the desired smearing, the resulting dough piece is often distorted in shape, which typically is like a rectangular pillow that has only outer dough exposed.

Rolling

If the co-extrusion process is used to create a laminate cookie preform, rolling the preform in accordance with the present invention removes the corners or edges that are created when the dough cylinders are cut. Similarly, if the sheet-deposit/sheet cut process is used, rolling the preform removes the crimped edges that are created when the first and third doughs are cut. Regardless of which preform process is used, rolling the laminate preform in accordance with the present invention gives the preform a substantially hemispherical or spherical shape and substantially encapsulates or enrobes the inner dough within the outer doughs.

The preferred hemispherical or spherical shapes provide the desired "roll" type flow dynamics while the cookie spreads during baking. This "roll" reduces the need for complex formulation changes that would otherwise be necessary to control dough spread for various oven types and baking conditions. The resulting rounded edges in the baked cookies are more uniform in color and are not as easily broken as compared to the thin crisp edges of cookies that are made without the rolling step.

In a laminated dough product that contains flavored chips, raisins, nuts, fruit bits, coconut, cereals, or other edible morsels in the inner dough, the rolling step also controls the degree of exposure/visibility of the morsels in the baked cookie as well as randomly distributing the morsels throughout the baked cookie. For example, dough preforms that are cut from coextruded concentric cylinders of doughs usually have morsels exposed approximately 180° apart at the points where the doughs were cut. If baked without rolling, these dough preforms result in cookies that have exposed morsels concentrated at opposite edges of the preform when viewed from the top. Rolling the laminate dough preforms reorients and randomizes morsel distribution.

Rolling the preforms after encapsulating the inner dough within an essentially uniform layer of distinct outer dough, also smears the outer dough's outer surface, thereby partially exposing or increasing the visibility of the morsels in the inner dough. Upon baking, the randomly distributed morsels can be readily seen on or near the cookie's surface. The desired degree of smearing of the outer dough's outer surface can be achieved by regulating the viscosities of the inner and outer doughs through formulation, mixing procedures, temperature, and sheet thickness. Alternatively, the morsels can be sprinkled onto the cookie preform just prior to rolling and thereafter rolling the sprinkled preform to randomly distribute the morsels and cause them to penetrate the outer dough layer. These techniques can, of course, be combined if it is desired to have morsels in both inner and outer doughs.

Figure 3:
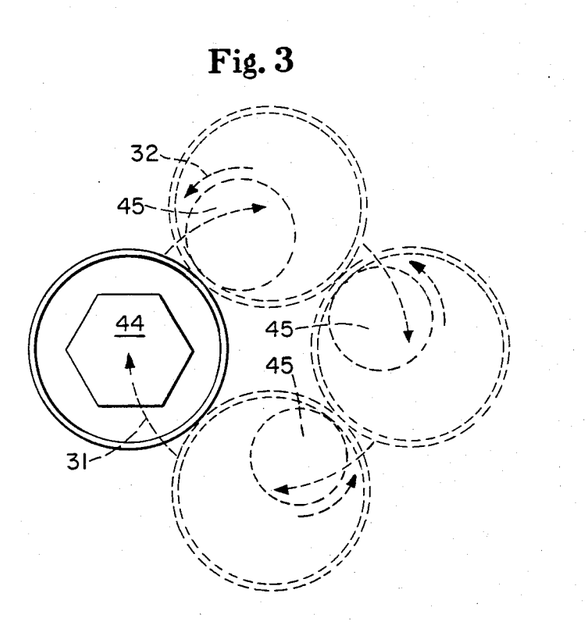
FIG. 3 is a simplified bottom plan view of a single closed-top cup unit of the present invention rolling a cut laminated dough piece.
Figure 4:
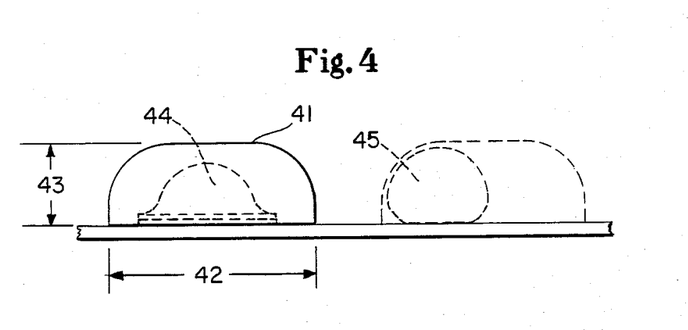
FIG. 4 is a simplified side elevation view of the single closed-top cup unit shown in FIG. 3.

In a preferred embodiment, an orbiting cup device as depicted in FIGS. 5 through 8 is employed to roll the laminate dough preforms. The operation of a single cavity or closed-top cup unit of the preferred orbiting cup device is shown in FIGS. 3 and 4. In FIG. 4, dough-shaping cup 41 has an external diameter 42 and a height 43. The initial position of the cookie preform within the cup is represented by 44. It's position during rolling is represented by 45. As shown in FIG. 3 and indicated by arrow 31, the cup orbits in a circular motion and rolls the preform 45 within the cup in the direction of rotation indicated by arrow 32.

Within each individual cup or cavity unit, which itself does not revolve relative to the platen, the dough preform rolls around against the cup's interior surface until it becomes substantially hemispherical or substantially spherical in shape. The force of the orbiting motion reduces the diameter of the laminate dough preform and thereby increases the preform's height. This growth is restricted by the cup or cavity's top surface. The periphery and top of the cavity 41 form the preform into the desired shape and smear its top layer. The pre-ordained pattern of movement can be controlled by any of several suitable means well known in the art and therefore not shown, e.g., a cam and follower arrangement. By stopping the cavity at a predetermined position, the preform is correctly placed on the discharge belt for further processing.

The degree of visibility of morsels contained in the inner dough achieved by smearing the top surface of the outer dough layer is dependent on the depth of the orbiting cup or cavity relative to the size of the cookie preform, the number of orbits or rotations made by the unit, the orbiter speed, and the cup or cavity's interior shape and finish. A variation of about 0.10 inch (0.25 cm.) in depth of the cavity can produce visible results. In general it has been observed that cups or cavities which are too shallow relative to the size of the preform have a tendency to tear open the top dough layer while cups or cavities which are too deep relative to the size of the preform leave the top layer untouched and morsels contained in the inner dough covered. It has been found that for a round cup or cavity a depth of about 0.75 inch (1.9 cm.) and a diameter of about 2.4 inches (6.1 cm) is preferred for rolling a preform having an initial height of about 0.6 inch (1.5 cm.) and an initial effective diameter of about 1.6 inch (4 cm), as measured across the preform's widest portion. The number of orbits of the cup or cavity required to achieve the desired level of morsel visibility is also dependent upon ambient temperature, humidity, and dough viscosity. Dough viscosity can normally be controlled through formulation and temperature.

Orbiter speed and cup or cavity shape and finish also affect the appearance of the final product by changing the level of work input into the laminate dough piece. Orbiter speeds can range from about 10 to about 200 rpm (revolutions per minute). Speeds of about 60 to about 120 rpm are preferred. Lower speeds require a greater number of orbits while high speeds can result in oval or parallelogram-shaped dough pieces instead of the preferred spherical or hemispherical shape. The orbit of the preform does not coincide with the orbit of the cup or cavity, but is of a smaller radius and is a function of the inside diameter of the cavity, as shown in FIG. 3. Ovals, parallelograms, and other less desirable shapes can also be generated by improper cup shape and finish. A relatively rough finish is preferable on the inside of the cup or cavity to avoid misshapen preforms. Preferred interior materials for the cup include food grade plastics, Celcon ® (registered trademark of the Celanese Corp.), Plexiglass ® (registered trademark of the Rohm & Haas Corp.), and the like.

Any of several cup or cavity interior and exterior shapes can be employed. In general, a hemispherical interior with a circular edge is preferred.

Figure 6:
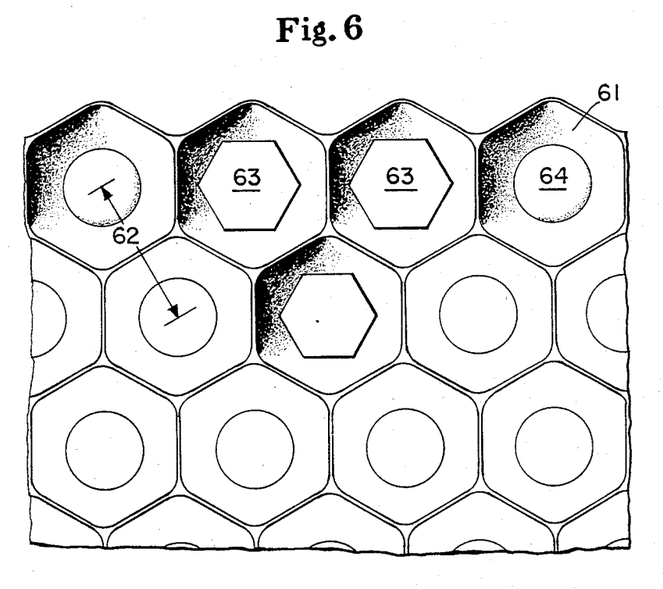
FIG. 6 is a fragmentary bottom plan view of a portion of a platen of multiple cavities that shows the cavity interior and the initial position of a hexagonally shaped laminate dough preform to be reshaped.

In a preferred embodiment of the present invention, several cup or cavity units are operated simultaneously. FIG. 6 illustrates a portion of such a multi-unit platen. The platen of FIG. 6 is viewed from the bottom looking into the cup or cavity interiors and shows the adjacent location of the individual cavities, denoted as 61. These individual units do not revolve independently about their individual axes. The distance 62 between unit centers coincides with the positioning of the laminate dough preforms on conveyor 54 and is designed to accommodate a reasonable variation in dough spread during baking. The specific orientation 63 of any given hexagon-shaped dough preform within an individual cavity or cup unit is not crucial. A flat circular area 64 closes the top of each cavity. The interior edges of the cavities are preferably circular in shape, but can be of a multi-sided configuration such as hexagonal, as generally shown in FIG. 6. The use of hexagonally shaped cavities minimizes space between cavities, permits adjacent nesting of units, and minimizes the possibility of dough finding its way between the cavities or cups. When the cavities are hexagonal or multi-sided, they preferably employ rounded corners, as generally shown in FIG. 6.

The cup's interior shape is a factor that affects the visibility of chips or morsels in the final cookie. A unit with a hemispherical interior with a circular edge results in greater visibility of chips through increased smearing of the top surface of the outer dough layer than is achieved by one that is hexagonal at its lowermost edge and which transitions to a substantially hemispherical shape at its apex.

Figure 5:
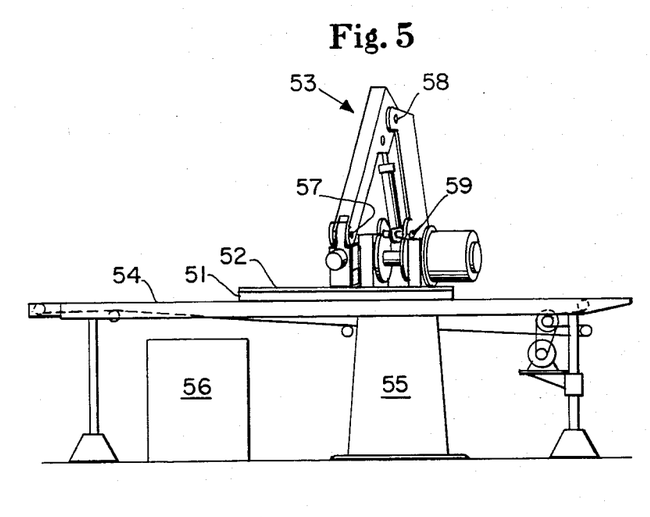
FIG. 5 is a simplified fragmentary elevation view of a particularly preferred embodiment of an orbiting apparatus of the present invention.
Figure 7:
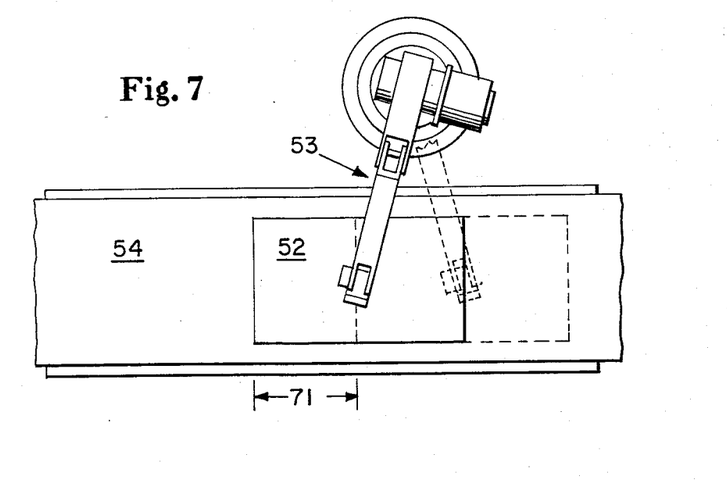
FIG. 7 is a simplified fragmentary top plan view of the apparatus shown in FIG. 5.
Figure 8:
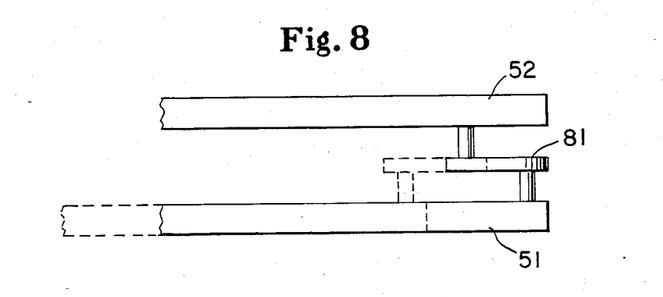
FIG. 8 is a schematic fragmentary side elevation view of the crank device pivotally connecting platen 51 and platen 52 in the apparatus of FIG. 5, said view showing the orbiting motion of platen 51.

As illustrated by FIGS. 5 and 7, a large platen 51 having one or more rows of one or more cup units or cavities is lowered by mechanical arm 53 over one or more dough preforms supported by moving belt 54 such that each individual dough preform is contained within one individual cavity or cup unit. Platen 51 is then rotated in a circular orbital motion while simultaneously and continuously moving horizontally, preferably at the same speed as conveyor 54, a distance 71 in the form of a flat spiral, thereby rolling the laminate dough preforms. Platen 51 is preferably orbited by means of a crank-type mechanism of the type generally illustrated in FIG. 8, said crank mechanism being pivotally connected to platen 51 and to a second platen 52. Second platen 52 is connected pivotally to mechanical arm 53 and does not orbit. In operation, platens 51 and 52 are moved horizontally in the direction of movement of the moving belt 54 a distance 71, elevated slightly to clear the rolled preforms, moved horizontally in the opposite direction a distance 71, lowered over a new set of unrolled preforms, and repeat in a continuous cycle. Platen 51 does not have to be in direct contact with moving belt 54 at its lowest point of travel to effectively roll the cookie preforms. It preferably remains slightly above the belt surface throughout the rolling operation. However, the gap between the cavities and the belt should be minimized to prevent dough from escaping through the gap. Platen 52 can be any number of distinct shapes such as a rectangular plate, a framework of arms, or other equivalent connecting means between mechanical arm 53 and orbiting platen 51.

For maximum flexibility, the motion of platens 51 and 52 and mechanical arm 53 can be controlled using electrical motors and servo-mechanisms which can be adjustably controlled by means of a computer 56, said control systems and computers being well known in the art and therefore not described in detail. The number of orbits can be varied within a fixed stroke distance or, alternatively, the stroke distance can be varied according to the number of orbits. The number of orbits per stroke and the stroke distance are adjusted for the specific product depending on dough viscosity, dough rheology, the desired level of work input into the dough, and the desired degree of chip visibility and randomization. When each stroke is completed, the orbiting motion is stopped at a predetermined position thereby correctly placing the dough preforms on belt 54 for further processing, e.g. baking. Platens 51 and 52 are then raised above the dough pieces and returned to the initial stroke position to begin a new cycle. In a preferred embodiment, the belt supporting the dough preforms continuously advances throughout the dough rolling and platen recycling operations.

Base support 55 is rotatably connected to mechanical arm 53 which preferably includes articulating joints at points 57, 58 and 59 in order to move platens 51 and 52 horizontally and vertically simultaneously during the working cycle. The platens can be positioned for easy cleaning and maintenance.

Summary

It will be appreciated that still other embodiments or executions of this invention can be devised without departing from its scope and spirit and without losing its advantages. In particular, the present invention and its rolling process results in a laminate dough preform having different flow dynamics during baking, thereby reducing the complexity of formulation required to control dough spread. In addition, since the laminate dough pieces are reshaped by the rolling operation, the manner of making the laminate dough preforms becomes less critical in making laminate cookies with good appearance and without crisp edges. In addition, for a laminate cookie product containing flavored chips or other morsels in one or more of its doughs, the appearance of the morsels in the baked cookie can be controlled and enhanced.

Industrial Applicability

The following embodiments are illustrative of preforms that have been rolled using apparatus of the present invention:

EXAMPLE 1

| Ingredients | Percent by Weight |
| --- | --- |
| First Dough | |
| Hydrogenated vegetable shortening | 16.5 |
| Sugar | 31.1 |
| High fructose corn syrup | 5.1 |
| Flour | 37.4 |
| Flavor and minor ingredients | 1.0 |
| Water | 8.9 |
| Second Dough | |
| Hydrogenated vegetable shortening | 15.5 |
| Sugar | 9.5 |
| High fructose corn syrup | 26.4 |
| Flour | 24.6 |
| Flavoring and minor ingredients | 3.7 |
| Chocolate chips | 20.3 |
| Third Dough | |
| Hydrogenated vegetable shortening | 16.5 |
| Sugar | 31.1 |
| High fructose corn syrup | 5.1 |
| Flour | 37.4 |
| Flavor & minor ingredients | 1.0 |
| Water | 8.9 |

The first dough was formed by mixing the ingredients in the following order: the high fructose corn syrup, water, and liquid flavor ingredients were mixed, then the shortening added and the mixture creamed. The sugar was then added, mixing continued, and then the flour and other minor dry ingredients were added.

The second dough was prepared by mixing the water and liquid flavoring material with the high fructose corn syrup. The shortening was then added and the mixture creamed until the shortening began to crystallize. The sugar was then added, and the mixture was creamed again. All the dry ingredients were then mixed in.

The third dough was prepared in the same manner as the first dough.

The first dough was rolled into a sheet 1–2 mm. in thickness. About 10 grams of the second dough was formed into a ball (substantially spherical) which was placed on top of the first dough. The third dough was then rolled into a 1–2 mm. sheet and placed on top of the ball of second dough. The sheets of dough were then cut in a hexagon shape about 4 cm. in diameter around the deposits of the second dough. The edges of each were crimped manually to seal the ball of second dough between the hexagons of first and third doughs. One half of the resulting composite dough preforms were rolled in accordance with the present invention with an apparatus of the type generally shown in FIGS. 5 and 6 and yielded a substantially spherical laminate cookie preform. The remainder were baked as hexagon-shaped preforms. Upon baking at about 305° F. to 310° F. (152° C. to 154° C.) for about 8½ minutes, a roll type flow occurred in the cookies which had been rolled, resulting in a cookie that did not have undesirable thin, crisp edges. Furthermore, the rounded edges were uniform in color and the chocolate chips contained in the inner dough were evenly distributed throughout the cookie's outer dough and were readily visible. The cookie diameters averaged 2.36 inches (5.99 cm.).

For the hexagon-shaped preforms which were not subjected to rolling in accordance with the present invention, a sliding type of flow was obtained upon baking. The baked cookies had thin, crisp, easily breakable edges of varying color. The chocolate chips were virtually invisible. The cookie diameters averaged 2.48 inches (6.30 cm.).

EXAMPLE 2

| Ingredients | Percent by Weight |
| --- | --- |
| First Dough | |
| Hydrogenated vegetable shortening | 16.7 |
| Sugar | 30.8 |
| High fructose corn syrup | 4.6 |
| Molasses (24 ± 4% invert sugar) | 1.5 |
| Baking soda | 0.5 |
| Flour | 37.4 |
| Flavor and minor ingredients | 1.0 |
| Water | 7.5 |
| Second Dough | |
| Hydrogenated vegetable shortening | 15.5 |
| Sugar | 9.5 |
| High fructose corn syrup | 26.4 |
| Baking Soda | 0.5 |
| Flour | 24.2 |
| Flavor and minor ingredients | 3.6 |
| Chocolate chips | 20.3 |
| Third Dough | |
| Hydrogenated vegetable shortening | 16.7 |
| Sugar | 30.8 |
| High fructose corn syrup | 4.6 |
| Molasses (24 ± 4% invert sugar) | 1.5 |
| Baking soda | 0.5 |
| Flour | 37.4 |
| Flavor and minor ingredients | 1.0 |
| Water | 7.5 |

The first dough was formed in the following manner: the baking soda was dissolved in the water and combined with the flavor and molasses; the combination was mixed with the high fructose corn syrup; the shortening was added and the mixture creamed. Half of the sugar was then mixed in, the flour and minor ingredients were added and mixed, and the remainder of the sugar added and mixed.

The second dough was prepared by first mixing the high fructose corn syrup, flavor, and baking soda. The shortening was added and the mixture creamed. Half of the sugar was mixed in, the flour and minor ingredients were added and mixed, and the remainder of the sugar was then added and mixed. Finally, the chocolate chips were mixed in.

The third dough was prepared in the same manner as the first dough.

The first dough was extruded into a sheet about 2–4 mm. in thickness onto a continuously moving belt. Discrete hemispherical deposits of the second dough weighing about 12.5 grams each were placed on the sheet of first dough in an ordered pattern by means of a rotary molder. The third dough was extruded into a sheet about 2–4 mm. in thickness and placed over the lower sheet and deposits. The top sheet was tamped into place with a 6 inch diameter roller. The dough sheets were cut around the deposits of second dough to yield multiple hexagon shaped cookie preforms having an initial maximum height of approximately 0.6 inch (1.5 cm) and an initial maximum width of approximately 1.6 inch (4 cm), as measured perpendicular to its parallel edges. The preforms were then repositioned to provide proper alignment for rolling. The preforms were simultaneously rolled utilizing an apparatus of the type generally disclosed in FIG. 5 to a substantially hemispherical shape, thereby substantially encapsulating the second dough deposit within a layer comprising the first and third doughs. The orbiting cup device had a multiple cavity platen, each cavity having an interior of the type generally shown in FIG. 6. The distance across parallel sides of the hexagonal edge measured approximately 2.4 inches (6.1 cm). The platen, which was rotated at about 105 rpm, smeared the top surface of the outer layer of dough to expose and thereby increase the visibility of the chocolate chips in the inner dough. The platen's orbiting motion was stopped at a predetermined position to correctly place the preforms on the moving belt. The rolled preforms were transferred to an oven band and baked for about 8.5 minutes in a recirculating indirect gas-fired oven. The upper zones of the oven were maintained at a temperature of 330° F.±10° F. (165.5° C.±5.5° C.) and the bottom zones were maintained at a temperature of about 280° F.±5° F. (137.8° C.±2.8° C.). Upon baking, a roll type of flow dynamics, as generally illustrated in FIG. 1A, was obtained and resulted in cookies of the type generally shown in FIG. 1B, i.e., cookies that did not have undesirable thin, crisp edges. The baked cookies had an average diameter of from about 2.0 to about 2.2 inches (5.1 to 5.6 cm.) and an average weight of from about 11.5 to about 12.0 grams. Furthermore, the edges of the cookies were uniform in color and the chocolate chips initially contained in the inner dough were readily visible.

EXAMPLE 3

The hexagon-shaped cookie preforms of Example 2 were sprinkled with chocolate chips just prior to rolling. The preforms were rolled into a substantially hemispherical shape in accordance with the present invention. The rolling caused the added chips to be distributed over and penetrate into the outer dough layer. The rolled preforms were transferred to an oven band and baked as in Example 2. The baking dynamics and resulting baked cookies were similar to those in Example 2. However, a higher level of chip visibility was achieved in the resultant cookies.

EXAMPLE 4

| Ingredients | Percent by Weight |
| --- | --- |
| First Dough | |
| Hydrogenated vegetable shortening | 16.5 |
| Sugar | 30.4 |
| High fructose corn syrup | 4.5 |
| Molasses (26 ± 4% invert sugar) | 1.5 |
| Flour | 37.4 |
| Baking soda | 0.5 |
| Flavor and minor ingredients | 0.5 |
| Water | 8.6 |
| Second Dough | |
| Hydrogenated vegetable shortening | 15.5 |
| Sugar | 9.5 |
| High fructose corn syrup | 26.4 |
| Flour | 24.6 |
| Baking soda | 0.4 |
| Flavor and minor ingredients | 3.3 |
| Chocolate chips | 20.3 |

The two doughs were mixed the same as in Example 2. The doughs were then separately fed into the two distinct hoppers of a co-extrusion machine such as a Model DDP200-900S as available from Bepex-Hutt GmbH of Leingarten, West Germany. The dough was fed through the machine via feed rolls and extruded through a nozzle onto a conveyor belt. The extruder formed the doughs into continuous concentric cylinders such that the second dough was surrounded by an outer layer of the first dough. The laminate dough cylinder was then cut into individual cookie dough preforms so that the outer dough layer was smeared across the inner dough which would have otherwise been exposed by the cutting process. The laminate cookie preforms thus formed were pillow-shaped, rectangular pieces with the second dough enrobed in a non-uniform thickness layer of first dough. The laminate preforms were then repositioned to provide proper alignment for rolling in accordance with the present invention. The preforms were thereafter rolled into a substantially hemispherical shape. The second dough was thereby substantially encapsulated within a substantially uniform thickness outer layer of first dough. An orbiting cup device of the type generally disclosed in FIG. 5 having a multi-cavity platen with each cavity exhibiting an interior of the type generally disclosed in FIG. 6 was used. The platen, which was rotated at about 105 rpm, smeared the top surface of the outer layer of dough, thereby increasing the exposure of the chocolate chips contained in the inner dough. The platen's orbiting motion was stopped at a predetermined position to correctly align the preforms on the moving belt. The rolled preforms were then transferred to an oven band and baked for about 8.5 minutes in a recirculating indirect gas-fired oven. The upper zones were maintained at a temperature of 330° F.±10° F. (165.5° C.±5.5° C.) and the bottom zones were maintained at a temperature of about 280° F.±5° F. (137.8° C.±2.8° C.). Upon baking, a roll type of flow dynamics, as generally disclosed in FIG. 1A, was obtained. The edges of the resultant cookies were shaped as generally disclosed in FIG. 1B and were substantially uniform in color. The chocolate chips initially contained in the inner dough were evenly distributed throughout the cookie's outer dough and were readily visible. The cookies had an average diameter of from about 2.0 to about 2.2 inches (5.1 to 5.6 cm.) and an average weight of from about 11.5 to about 12.0 grams.

What is claimed is:

1. An apparatus for making a generally spherical laminate dough preform that has a first inner dough substantially uniformly encapsulated by at least one outer dough, said apparatus comprising:
    (a) means for creating a laminate dough preform comprising a first inner dough having a layer of a second outer dough covering a substantial portion of said first inner dough, said layer of outer dough being of non-uniform thickness;
    (b) a closed-top cavity of generally circular shape;
    (c) means for supporting said laminate dough preform beneath said closed-top cavity;
    (d) suspension means for moving said closed-top cavity in a predetermined direction about a predetermined axis of rotation without rotating said cavity relative to said suspension means; and
    (e) drive means for moving said suspension means in said predetermined direction, whereby said laminate dough preform is caused to rotate about the interior surfaces of said closed-top cavity, thereby substantially uniformly distributing said outer dough about the entire surface of said first inner dough.

2. The apparatus of claim 1 wherein said means for creating said laminate dough preform comprises apparatus for co-extruding a solid cylinder of said first inner dough within a concentrically positioned cylinder of said outer dough and thereafter cutting said co-extruded structure into discrete lengths.

3. The apparatus of claim 1 wherein said means for creating said laminate dough preform comprises apparatus for forming a sheet of said outer dough, depositing discrete portions of said inner dough on said sheet of outer dough, depositing another sheet of said outer dough over said inner dough portions, and thereafter cutting said outer doughs about the periphery of each of said inner dough portions.

4. The apparatus of claim 1 wherein said means for supporting said laminate dough preform comprises a conveyor belt.

5. The apparatus of claim 1 wherein said suspension means for moving said closed-top cavity comprises a platen.

6. The apparatus of claim 1 wherein said drive means moving said suspension means comprises an electric motor.

7. The apparatus of claim 1 wherein said closed-top cavity has an interior surface which is hexagon-shaped on its bottom edge and transitions to a substantially hemispherical shape.

8. The apparatus of claim 1 wherein said closed-top cavity has an interior surface which is circular-shaped on its bottom edge and transitions to a substantially hemispherical shape.

9. The apparatus of claim 1 wherein said drive means rotates said suspension means at a speed of from about 10 to about 200 revolutions per minute.

10. The apparatus of claim 1 wherein said drive means rotates said suspension means at a speed of from about 60 to about 120 revolutions per minute.

* * * * *

UNITED STATES PATENT AND TRADEMARK OFFICE
CERTIFICATE OF CORRECTION

PATENT NO. : 4,511,318

DATED : April 16, 1985

INVENTOR(S) : MICHAEL S. KOLODESH, EDWARD L. PETERS, RAYMOND J. MADGETT

It is certified that error appears in the above-identified patent and that said Letters Patent is hereby corrected as shown below:

Column 1, line 37, "at" should read -- art --.

Column 2, line 23, "ae" should read -- are --.

Column 6, line 1, "form" should read -- from --.

Column 9, line 13, "It's" should read -- Its --.

Signed and Sealed this

Sixth Day of August 1985

[SEAL]

Attest:

DONALD J. QUIGG

Attesting Officer     Acting Commissioner of Patents and Trademarks